April 11, 1939.    S. M. HILL ET AL    2,153,666
FILM REWINDING APPARATUS
Filed June 8, 1936
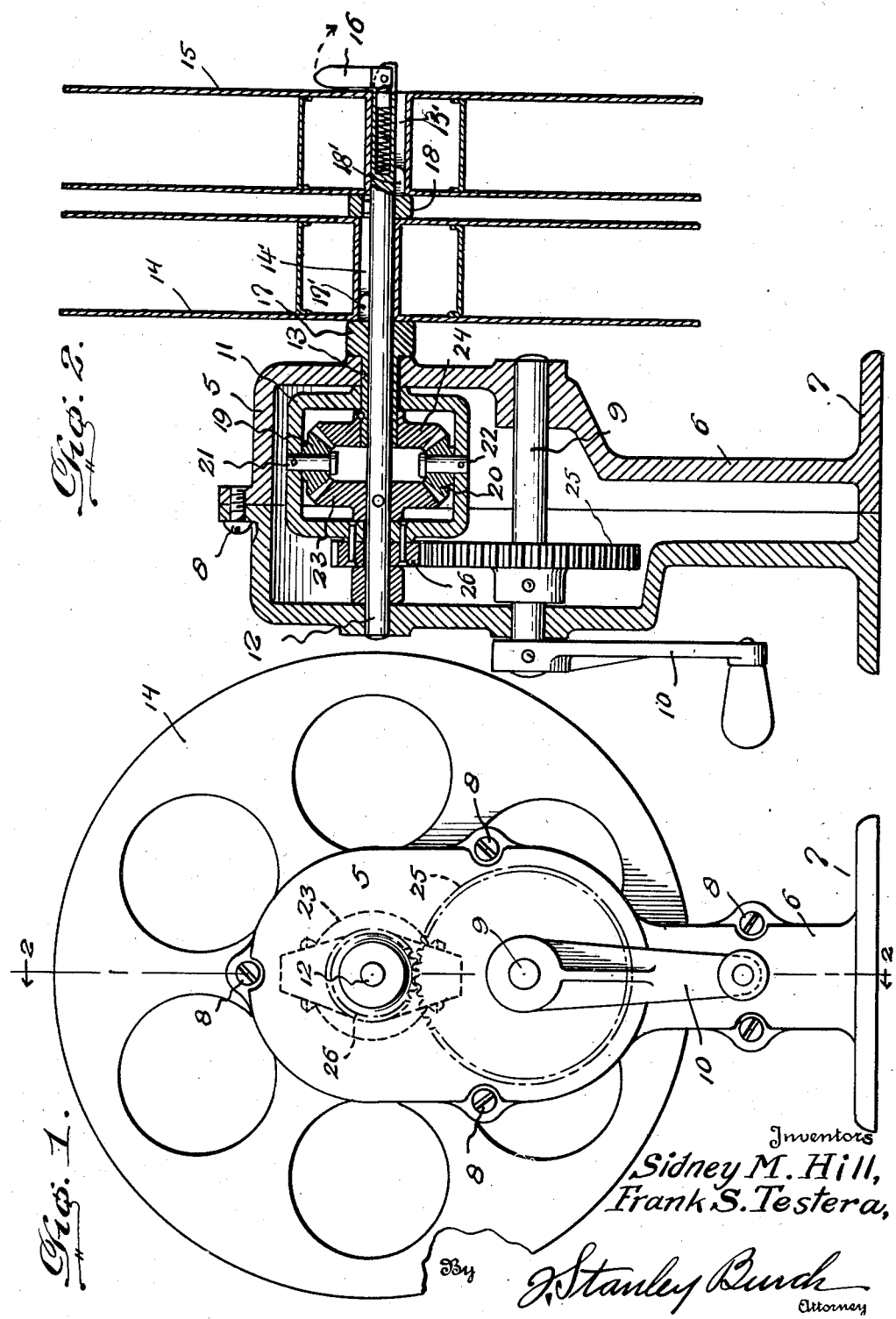
Inventors
Sidney M. Hill,
Frank S. Testera,
By J. Stanley Burch
Attorney Patented Apr. 11, 1939

2,153,666

UNITED STATES PATENT OFFICE 2,153,666

FILM REWINDING APPARATUS

Sidney Morgan Hill, Hollywood, and Frank Stewart Testera, Van Nuys, Calif.

Application June 8, 1936, Serial No. 84,202

7 Claims. (Cl. 242—55)

This invention relates to improvements in film rewinding apparatus particularly adapted for use in the motion picture industry, and the primary object of the present invention is the provision of an improved construction whereby a plurality of films may be wound simultaneously upon a plurality of reels driven from one and the same drive shaft, and whereby the tension in the films being rewound will be substantially constant irrespective of differences in diameter which may exist in the supply reels or the take up reels.

More particularly, the present invention contemplates the provision of a film rewinding apparatus of the above character which is extremely simple and compact in construction, easy and convenient to use and manipulate, and efficient in operation.

Other objects and features of the present invention will become apparent from the following description when considered in connection with the accompanying drawing, in which:

Figure 1 is a side elevational view of an embodiment of the present invention adapted for winding two films simultaneously upon two reels.

Figure 2 is a vertical section taken substantially on line 2—2 of Figure 1.

Referring in detail to the drawing, the present invention is illustrated in Figures 1 and 2 as including a gear housing or casing member 5 provided with a hollow supporting standard 6 and a base 7 whereby the device may be readily mounted on a table, stand, or the like. The housing 5, standard 6 and base 7 are preferably formed by two metallic castings separably secured or bolted together as at 8.

In the lower part of the gear housing 5 and extending transversely thereof is an operating or drive shaft 9, one end of which projects outwardly through one side of the housing 5 and has an operating hand crank 10 secured thereon.

Arranged in the upper portion of the housing 5 is a differential gearing including a differential housing 11 rotatably supported upon a solid shaft 12 and a tubular shaft or hollow sleeve member 13 that extend transversely of the housing 5 and parallel with the operating shaft 9. The inner end of shaft 12 is journaled in the side of housing 5 adjacent which the crank 10 is arranged, while the tubular shaft 13 is journaled in the opposite side of housing 5, the shaft 12 extending through the shaft 13 so that the latter is freely rotatable on said shaft 12 and relative to the latter, both of said shafts 12 and 13 projecting from the last-mentioned side of the housing 5. The shafts 12 and 13 are thus concentrically arranged and project from the same side of the housing 5. The shaft 12 has an end portion projecting outwardly beyond the shaft 13 and adapted to receive film spools 14 and 15. These spools, which have apertures dimensioned to fit on shaft 12 and grooves 14' and 15' in the walls of said apertures, are held in place on the shaft 12 by any suitable means, such as a finger 16 which, when the spools are in place, is pivoted to the position shown on the drawing. Suitable means 17, including a tongue 17' extending into groove 14' of spool 14, is provided on the tubular shaft or sleeve member 13 to space the reel 14 from the adjacent side of housing 5 and to key the reel 14 to the shaft 13, while a similar means 18, including a key member 18' extending into groove 15' of spool 15, is provided on shaft 12 to space the reel 15 from the reel 14 and to key the reel 15 to the shaft 12. The reels 14 and 15 are thus adjacently positioned for convenient access to both of them, and are also located at one and the same side of the housing 5 clear of the base 7, shaft 9 and crank 10, regardless of the size or diameter of the reels being employed.

Within the differential housing 11 and pinned thereto so as to move or rotate bodily therewith are a pair of bevel pinions 19 and 20, the pinion 19 being attached to the differential housing by a pin 21, and the pinion 20 being attached to said differential housing by a pin 22. Intermediate the pinions 19 and 20 and carried by the shafts 12 and 13, respectively, as well as meshing with said pinions 19 and 20 are bevel gears 23 and 24. The pinions 19 and 20 are rotatable on the pins 21 and 22, respectively, while the gears 23 and 24 are secured to the shafts 12 and 13, respectively.

The operating or drive shaft 9 carries a gear 25 arranged within the housing 5 and meshing with a gear 26 rigid with the adjacent inner end or side of differential housing 11.

In operation, rotation of drive shaft 9 by the crank 10 will impart motion to the gear 25, and through gear 26 and differential gears 19, 20, 23 and 24, will impart rotation to the shafts 12 and 13, and hence to the spools 14 and 15 to drive the latter in the same direction. If, however, the tension on one of the films being wound should tend to exceed the tension of the film being wound upon the other spool or reel, it will be obvious that this will tend to slow up the reel for the first-mentioned film and simultaneously effect, through the differential gears, an increase in the speed of the other reel until the tension on both films is equalized.

It will of course be understood that the invention is susceptible to various modifications and other embodiments such as fairly fall within the spirit and scope of the invention as claimed.

In view of the above, it will be seen that by providing the type of drive above described, it is possible to wind films upon a plurality of spools simultaneously, irrespective of the diameter of the spools of film supplying these reels or of the diameter of the rolls of films on the reels on which the films are being wound, at the same time maintaining the same tension upon the several films.

What we claim as new is:

1. A film rewinding apparatus comprising a gear housing, a differential gearing arranged in said gear housing and including a differential housing, a solid shaft extending transversely of and journaled in one side of said gear housing and having one gear of the differential gearing secured thereon, a tubular shaft journaled in the other side of said gear housing and having the other gear of said differential gearing secured thereon, said differential housing being journaled on said solid and tubular shafts, said solid shaft extending through and freely rotatable relative to said tubular shaft, one end of said solid shaft projecting outwardly from the second-named side of the gear housing beyond the tubular shaft and adapted to receive two film spools, means to removably hold said spools on said projecting end of the solid shaft, means to removably key one of said spools to the tubular shaft, means to removably key the other spool to the solid shaft, and a drive shaft journaled transversely of said gear housing below and parallel to said solid shaft and geared to said differential housing.

2. A film rewinder of the type described, comprising a casing member including a wall having a journal therein, a hollow sleeve member rotatably supported in said journal and projecting therefrom into said casing member, a shaft member journaled in said sleeve member for rotation with respect thereto and projecting a substantial distance therebeyond interior and exterior of said casing, driving means coupled to said sleeve and shaft within said casing for applying torque to each irrespective of the relative speeds of said sleeve and shaft, a pair of film reels having axial apertures dimensioned to fit on said shaft and having grooves in the walls of said apertures, said reels being mounted on said shaft one adjacent said casing and the other adjacent the outer end of the shaft, a tongue on said sleeve member extending outwardly adjacent the surface of said shaft into the said groove in the adjacent reel to force the latter to rotate with the sleeve, and a key member on said shaft extending into the said groove in the outer reel to cause the latter to rotate with said shaft.

3. A film rewinder of the type described, comprising a casing member having spaced apart walls and juxtaposed journals therein, a hollow sleeve member rotatably supported in one of said journals and projecting therefrom into said casing member, a shaft member journaled in said sleeve member for rotation with respect thereto, said shaft member extending through said casing and being journaled in said juxtaposed journal in the other wall, said shaft also projecting a substantial distance beyond said sleeve exterior of said casing, driving means coupled to said sleeve and shaft within said casing for applying torque to said sleeve and shaft irrespective of their relative speeds of rotation, a pair of film reels having axial apertures dimensioned to fit on said shaft and having grooves in the walls of said apertures, said reels being mounted on said shaft one adjacent said casing and the other adjacent the outer end of said shaft, a tongue on said sleeve member extending outwardly adjacent the surface of said shaft into said groove in the adjacent reel to cause the latter to rotate with the sleeve, and a key member on said shaft extending into the said groove in the outer reel to cause the latter to rotate with said shaft.

4. A film rewinder of the type described, comprising a casing member including a wall having a journal therein, a hollow sleeve member rotatably supported in said journal and projecting therefrom into said casing member, a shaft member journalled in said sleeve member for rotation with respect thereto and projecting a substantial distance therebeyond interior and exterior of said casing, driving means coupled to said sleeve and shaft within said casing for applying torque to each irrespective of the relative speeds of said sleeve and shaft, a pair of film reels having axial apertures dimensioned to fit on said shaft and having grooves in the walls of said apertures, said reels being mounted on said shaft one adjacent said casing and the other adjacent the outer end of the shaft, a tongue on said sleeve member extending outwardly adjacent the surface of said shaft into the said groove in the adjacent reel to force the latter to rotate with the sleeve, and a key member on said shaft extending radially from the shaft into the said groove in the outer reel to cause the latter to rotate with said shaft.

5. A film rewinder of the type described, comprising a casing member having spaced apart walls and juxtaposed journals therein, a hollow sleeve member rotatably supported in one of said journals and projecting therefrom into said casing member, a shaft member journaled in said sleeve member for rotation with respect therto, said shaft member extending through said casing and being journaled in said juxtaposed journal in the other wall, said shaft also projecting a substantial distance beyond said sleeve exterior of said casing, driving means coupled to said sleeve and shaft within said casing for applying torque to said sleeve and shaft irrespective of their relative speeds of rotation, a pair of film reels having axial apertures dimensioned to fit on said shaft and having grooves in the walls of said apertures, said reels being mounted on said shaft one adjacent said casing and the other adjacent the outer end of said shaft, a tongue on said sleeve member extending outwardly adjacent the surface of said shaft into said groove in the adjacent reel to cause the latter to rotate with the sleeve, and a key member on said shaft extending radially from the shaft into the said groove in the outer reel to cause the latter to rotate with said shaft.

6. In apparatus for simultaneously operating a multiplicity of film rewinding reels, the combination of a casing, differential housing means in the casing, differential gears carried by the housing means, a multiplicity of film reel operating shafts journaled in the casing and projecting outwardly of the casing from the same side thereof, said respective shafts being operatively connected to different differential gears so as to be simultaneously rotatable thereby but capable of rotation with respect to each other, a multiplicity of film reels, one mounted on the outwardly projecting portion of each of said shafts, and means for holding each reel against rotation relative to the shaft upon which it is mounted.

7. In apparatus for simultaneously operating a pair of film rewinding reels, the combination of a casing, differential housing means in the casing, differential gears carried by the housing means, a pair of concentric film reel operating shafts, said respective shafts being operatively connected to different gears of the differential so as to be simultaneously rotatable thereby but capable of rotation with respect to each other, said shafts projecting outwardly from the same side of the casing, a pair of film reels, one mounted on the outwardly projecting portion of each of said shafts and a spacer member between the reels for spacing them apart and allowing one to rotate with respect to the other.

SIDNEY MORGAN HILL.
FRANK STEWART TESTERA.